J. W. FIELDING.
PEANUT PICKER.
APPLICATION FILED JUNE 18, 1910.

985,575.

Patented Feb. 28, 1911.
2 SHEETS—SHEET 1.

Witnesses

Inventor
J. W. Fielding
By Woodward & Chandlee
Attorneys

J. W. FIELDING.
PEANUT PICKER.
APPLICATION FILED JUNE 18, 1910.
985,575.
Patented Feb. 28, 1911.
2 SHEETS—SHEET 2.
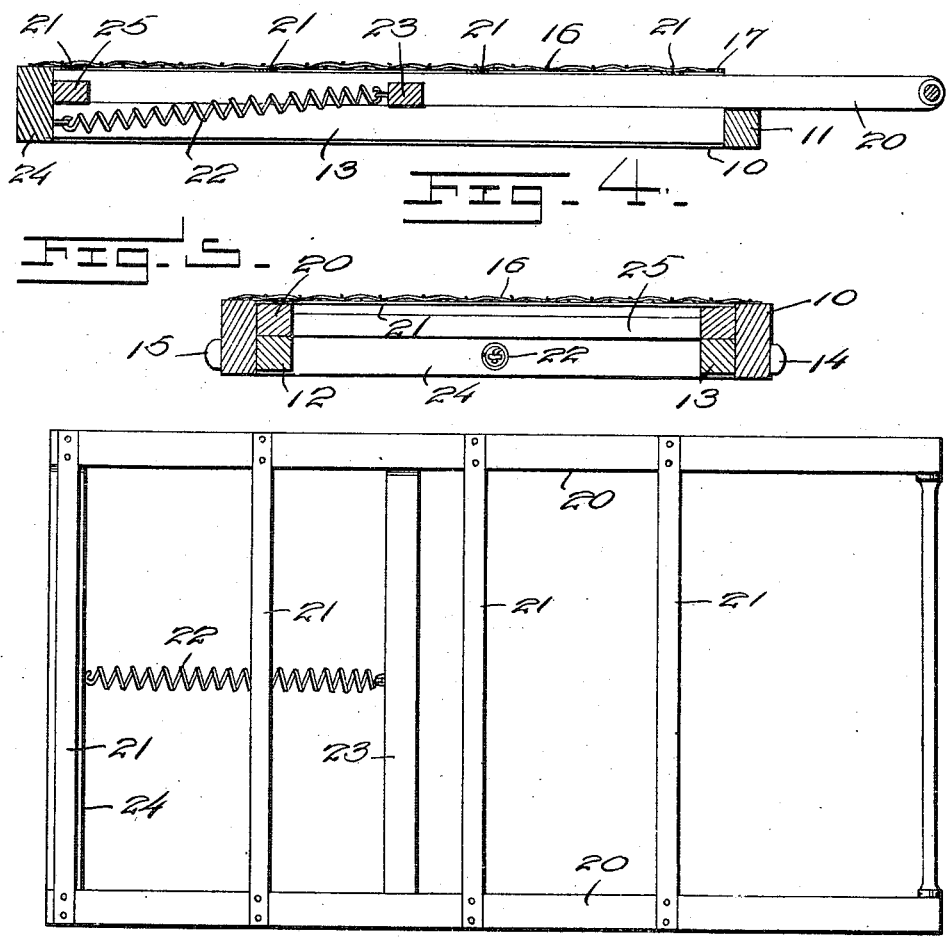
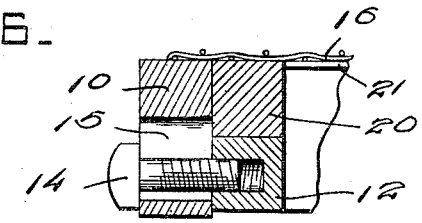
Witnesses
Inventor
J. W. Fielding
By Woodward & Chandlee
Attorneys

UNITED STATES PATENT OFFICE.

JAMES W. FIELDING, OF DAY, FLORIDA.

PEANUT-PICKER.

985,575.    Specification of Letters Patent.    Patented Feb. 28, 1911.

Application filed June 18, 1910. Serial No. 567,703.

*To all whom it may concern:*

Be it known that I, JAMES W. FIELDING, a citizen of the United States, residing at Day, in the county of Lafayette and State of Florida, have invented certain new and useful Improvements in Peanut-Pickers, of which the following is a specification.

This invention relates to an improvement in peanut strippers, the object of said invention being to provide an effective, as well as an easily constructed device of this character, which will remove the peanuts from the vines upon which they grow.

With these and other objects in view, the present invention consists in the combination and arrangement of parts which will be hereinafter more fully described and particularly pointed out in the appended claim, it being understood that the changes in the specific structure shown and described, may be made within the scope of the claim without departing from the spirit of the invention.

Figure 1:
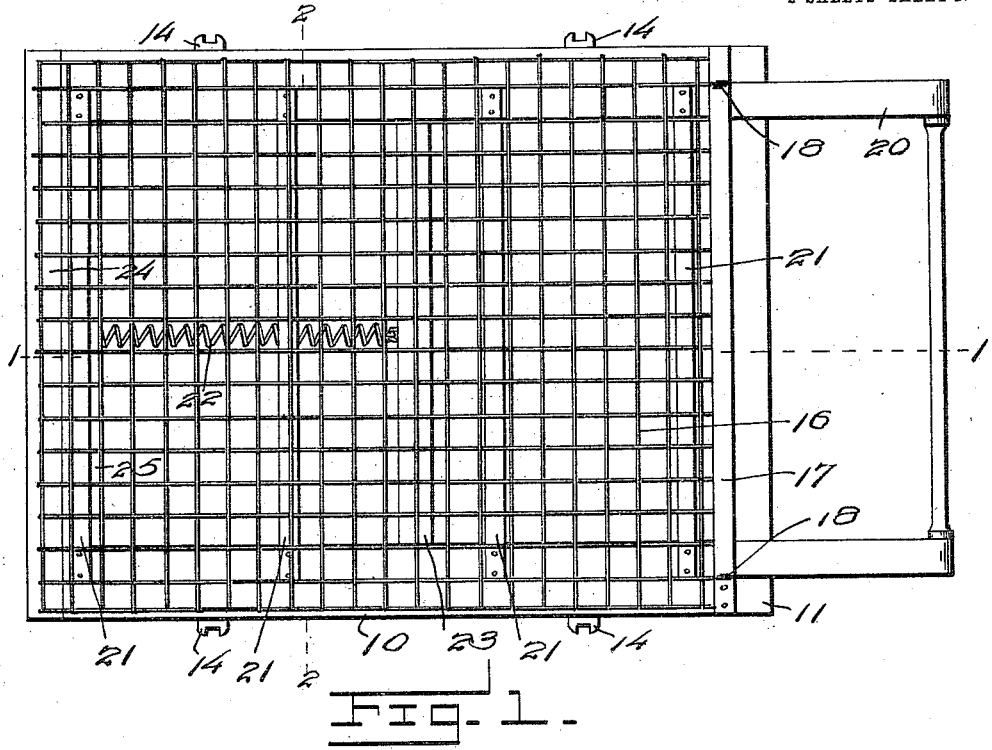
Figure 2:
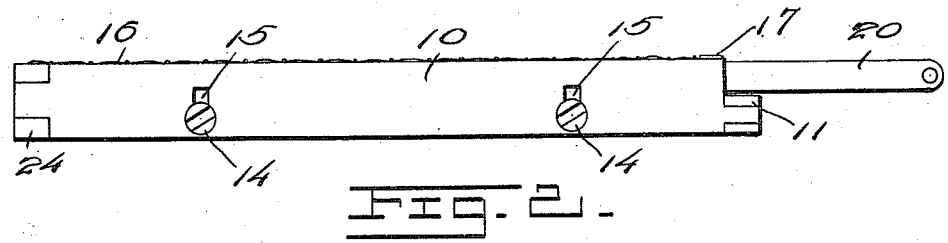
Figure 3:
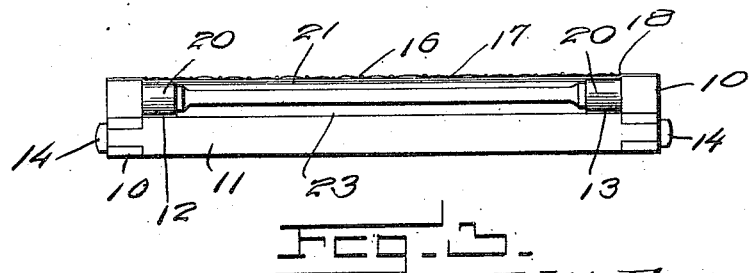

In the drawings: Figure 1 is a top plan view of the device, Fig. 2 a side elevation, Fig. 3 an end view, Fig. 4 a section taken on the line 1—1 of Fig. 1, Fig. 5 a section taken on the line 2—2 of Fig. 1, Fig. 6 a view of the cutting mechanism removed, and, Fig. 7 a detail view showing the manner of supporting the cutting mechanism.

In the drawings: 10 designates a rectangular frame, one of its end members 11 being reduced. Arranged within the frame are the supporting members 12 and 13, which are clamped to the side bars of the frame by means of screws 14, which are arranged in slots 15, in order that the supporting members may be adjusted on the frame. A screen 16, is adapted to cover the frame, its edge portions being secured thereto. A knife 17 extends transversely across the frame, said knife being provided with the recurved portions 18, by which the same is secured to the frame. A second frame 20 is adapted to slide on the members 12 and 13, said frame being half the thickness of the members which compose the supporting frame. Extending transversely across the frame 20 are a plurality of knives 21, which are positioned to ride flush with the screen 16, as the frame 20 is reciprocated. In order to adjust the knives vertically, the screws 14 are released, and the supporting members 12 and 13 forced upward, the screws traveling in the slots formed in the frame. As before stated, the cross-beam 11 of the frame 10, is just half the thickness of the other members which compose the frame, thereby forming a transverse support for the frame 20. A spring 22 is secured to the cross-bar 23, of the frame 20, and to the end portion 24 of the frame 10, the normal tendency of said spring being to hold the cross bar 25, of the sliding frame, against the cross bar 24, of the stationary frame.

In operating the device, the peanut vines are deposited on the screen 16, the peanuts extending through said screen. The sliding member 20 is now drawn forward by means of its handle 26, the knives 21 passing along the under-face of the screen, thereby severing the peanuts from the vine, and allowing the same to fall in a suitable receptacle. The knife 17 is so positioned as to positively sever any portion of the vine which may be drawn forward. When the frame 20 has been withdrawn its entire length, the handle 26 is released, the spring 22 returning the frame to its former position, the return movement of the frame tending to remove any portions of vine which may protrude through the screen, thus cleaning the screen and preventing the same from becoming clogged.

The many advantages of a device of this character will be clearly apparent, as the same will not only be effective in practice, but of such construction, that it may be manufactured at a very small cost. It will also be noted that all the parts may be readily assembled, the structure being one which may be conveniently taken apart for shipment.

What is claimed is:

A device of the class described, comprising, a rectangular frame, said frame being provided with a reduced end portion, a screen arranged on said frame, a knife arranged transversely across said frame, a plurality of independently adjustable supporting bars positioned within said frame, said bars lying flush with the side bars of said frame, a rectangular member slidably arranged on said supporting members, a spring secured to said member and said frame, and a plurality of knives arranged transversely on said rectangular member.

In testimony whereof I affix my signature, in presence of two witnesses.

JAMES W. FIELDING.

Witnesses:
G. F. STRICKLAND,
G. W. ADAMS.

Copies of this patent may be obtained for five cents each, by addressing the "Commissioner of Patents, Washington, D. C."